United States Patent

Sun et al.

[11] Patent Number: 5,971,332
[45] Date of Patent: Oct. 26, 1999

[54] WRIST PAD MOUNTING ARRANGEMENT FOR A NOTEBOOK COMPUTER

[75] Inventors: Der-Jang Sun; Lu-Long Tsao, both of Taipei, Taiwan

[73] Assignee: Inventec Corporation, Taipei, Taiwan

[21] Appl. No.: 08/968,964

[22] Filed: Nov. 12, 1997

[30] Foreign Application Priority Data

Jul. 15, 1997 [TW] Taiwan ................................ 86211811

[51] Int. Cl.⁶ ................................ G06F 1/16; H05K 7/16
[52] U.S. Cl. .................... 248/118; 248/118.1; 248/118.3; 361/683; 361/680; 40/715
[58] Field of Search ................... 248/118, 118.1, 248/118.3, 118.5, 918; 361/679, 680, 681, 683; 400/714, 715, 691

[56] References Cited

U.S. PATENT DOCUMENTS

| | | |
|---|---|---|
| 5,346,164 | 9/1994 | Allen ........................................ 248/118 |
| 5,375,800 | 12/1994 | Wilcox et al. ......................... 248/118.1 |
| 5,402,972 | 4/1995 | Schmidt ................................... 248/118 |
| 5,596,481 | 1/1997 | Liu et al. ................................. 361/683 |
| 5,596,482 | 1/1997 | Horikoshi ................................ 361/683 |

*Primary Examiner*—Leslie A. Braun
*Assistant Examiner*—Long Dinh Phan
*Attorney, Agent, or Firm*—Bacon & Thomas, PLLC

[57] ABSTRACT

A wrist pad mounting arrangement which includes an elongated pad, two linkages respectively coupled between two opposite ends of the elongated pad and two opposite lateral sides of a mainframe of a notebook computer for permitting the elongated pad to be moved between a first position, in which the elongated pad is covered on a display unit, and a second position, in which the elongated pad is supported on a front side of the mainframe of the notebook computer in a sloping position for supporting the user's wrists and permitting the display unit to be opened from the mainframe of the notebook computer.

1 Claim, 4 Drawing Sheets

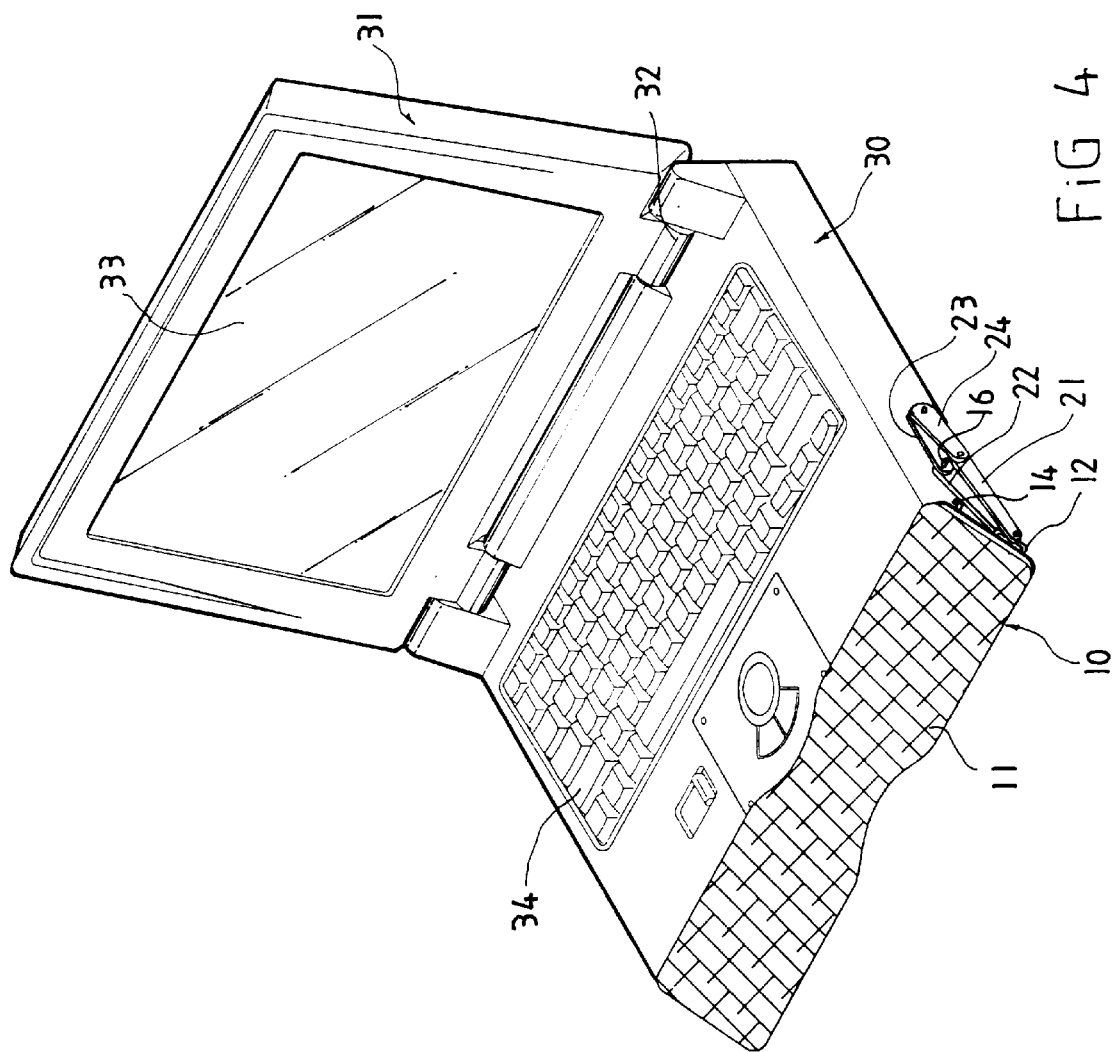

WRIST PAD MOUNTING ARRANGEMENT FOR A NOTEBOOK COMPUTER

BACKGROUND OF THE INVENTION

The present invention relates to notebook computers, and more specifically to a wrist pad mounting arrangement for a notebook computer which enables the wrist pad to be moved between a first position in which the wrist pad is covered on the display unit of the notebook computer to hold it in the closed position, and a second position in which the display unit of the notebook computer is permitted to be opened from the mainframe of the notebook computer.

A conventional notebook computer is equipped with snap means for holding the display unit and the mainframe in a closed status. The snap means occupies much installation space inside the notebook computer. Further, because the snap means is installed inside the notebook computer, the repair work is complicated when the snap means is damaged.

SUMMARY OF THE INVENTION

It is one object of the present invention to provide a wrist pad mounting arrangement for a notebook computer which is coupled to the mainframe of the notebook computer on the outside and without occupying any internal space of the notebook computer. It is another object of the present invention to provide a wrist pad mounting arrangement for a notebook computer which is coupled to the mainframe by two four-bar linkages. It is still another object of the present invention to provide a wrist pad mounting arrangement for a notebook computer which can be alternatively set between a first position in which the wrist pad is covered on the display unit of the notebook computer to hold it in the closed position, and a second position in which the wrist pad is supported on a front side of the mainframe of the notebook computer in a sloping position and supporting the user's wrists for permitting the display unit to be opened from the mainframe of the notebook computer.

BRIEF DESCRIPTION OF THE DRAWINGS

FIG. 4 is another perspective view of the present invention, showing the display unit opened, and the wrist pad set in the operative position.

DETAILED DESCRIPTION OF THE PREFERRED EMBODIMENT

Figure 1:
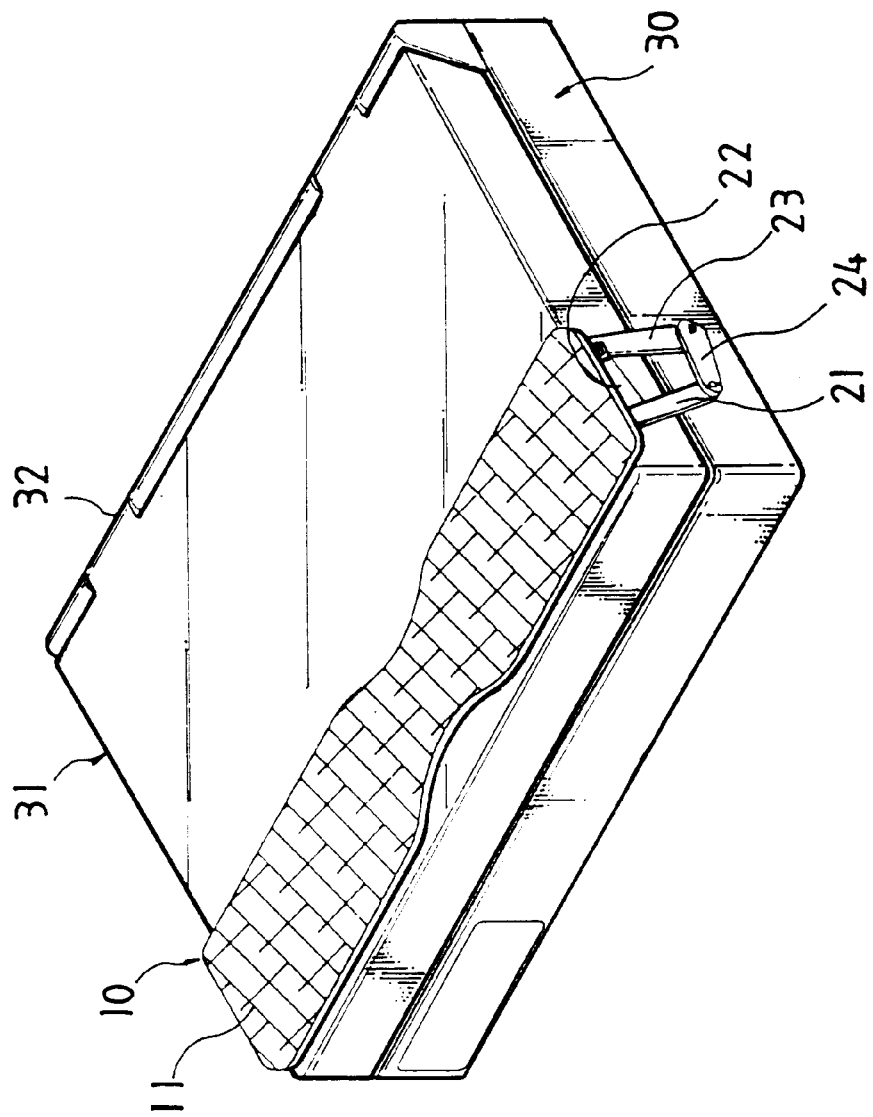
FIG. 1 is a perspective elevational view of the present invention, showing the notebook computer closed, and the wrist pad set in the non-operative position.

Referring to FIG. 1, a notebook computer is shown comprised of a mainframe 30, and a display unit 31. The display unit 31 comprises a LCD (liquid crystal display) 33 for displaying a video signal provided by the mainframe 30. The mainframe 30 is provided with a keyboard 34 for data input. The display unit 31 and the mainframe 30 are pivoted together by a pivot means 32. The display unit 31 can be turned about the pivot means 32, and opened from or closed on the mainframe 30.

Referring to FIG. 1 again, a wrist pad 10 is provided at the mainframe 30. The wrist pad 10 comprises an elongated pad 11. The pad 11 has two mounting plates 12 extending perpendicularly from its bottom side near its two opposite ends, two pairs of first links 21;22 and two pairs of second links 24;23 respectively coupled between the mounting plates 12 of the pad 11 and two opposite lateral sides of the mainframe 30. Each mounting plate 12 has an elongated slot 13 disposed in parallel to the pad 11. The first links 21;22 have a respective top end respectively coupled to the elongated slots 13 of the mounting plates 12 by a slip joint, and a respective bottom end respectively pivoted to the second links 24;23. The second links 24;23 have a respective top end respectively pivoted to the bottom ends of the first links 21;22, and a respective bottom end respectively pivoted to one side of the mainframe 30. The pad 11 further comprises two lugs 14 extending perpendicularly from its bottom side near its two opposite ends, and respectively spaced from the mounting plates 12. The lugs 14 define a respective locating notch 15. Two locating pins 16 are respectively provided to form the pivot points between the first links 22 and the second links 23.

Figure 2:
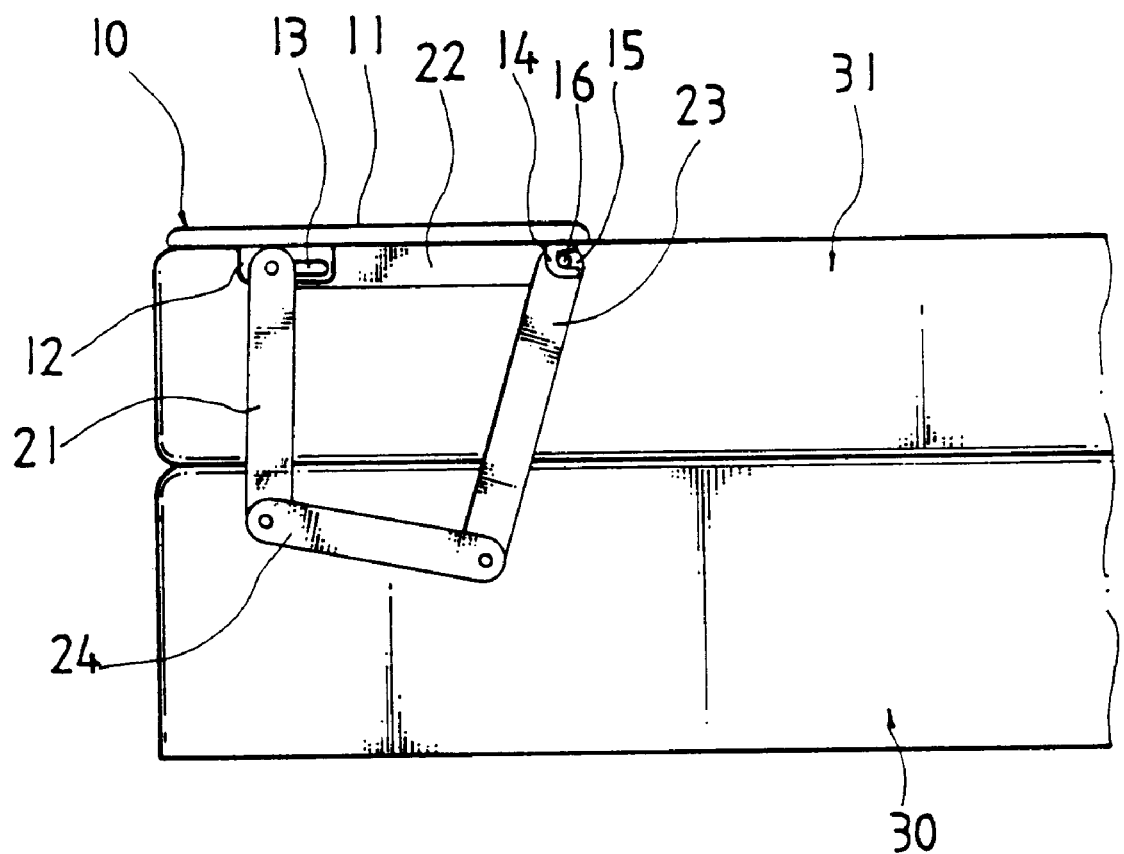
FIG. 2 is a side view in section in an enlarged scale of a part of FIG. 1.

Referring to FIG. 2 and FIG. 1 again, when the display unit 31 is closed on the mainframe 30, the wrist pad 10 is turned upwards and backwards, then the pad 11 is pushed backwards and covered on the display unit 31. Because the top ends of the first links 21;22 are respectively coupled to the elongated slots 13 of the mounting plates 12 by a slip joint, the pad 11 can be pushed forwards and backwards relative to the links 21;22 within the constraint of the elongated slots 13. When the pad 11 is set into position, the locating pins 16 on the links 22;23 at two opposite sides of the wriest pad 10 are respectively forced into engagement with the locating notches 15 on the lugs 14 to hold the pad 11 closed on the display unit 31.

Figure 3:
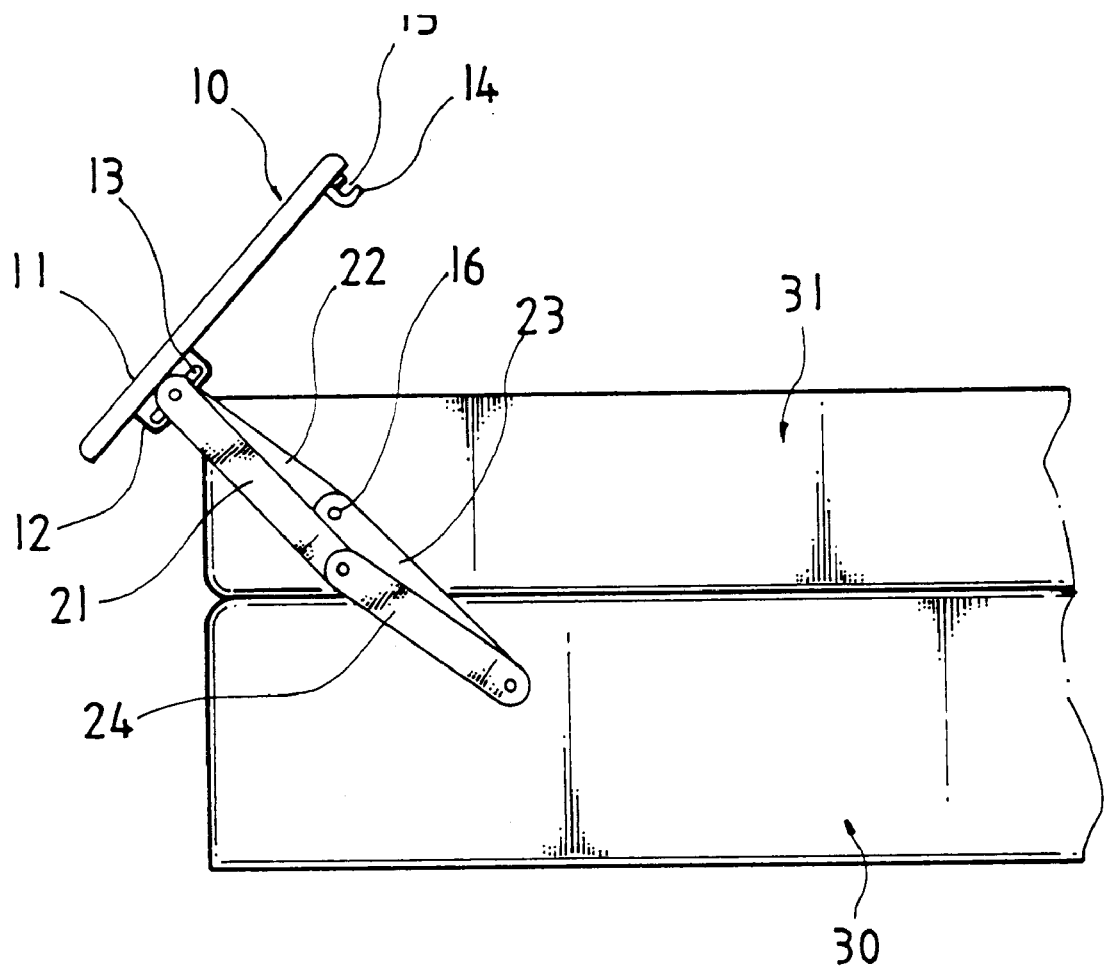
FIG. 3 is similar to FIG. 2 but showing the pad of the wrist pad lifted from the display.

Referring to FIGS. 3 and 4, when the locating pins 16 are respectively disengaged from the locating notches 15, the wrist pad 10 can then be turned upwardly and then downwardly and forwardly from the position shown in FIG. 1 to the position shown in FIG. 4, thus permitting the pad 11 to be obliquely supported on the front side of the mainframe 30 for supporting the user's wrists.

While only a preferred embodiment of the present invention has been shown and described, it will be understood that various modifications and changes may be made thereto without departing from the spirit and scope of the disclosed invention.

What the invention claimed is:

1. A wrist pad mounting arrangement for mounting on a mainframe of a notebook computer, the wrist pad comprising:

an elongated pad having two mounting plates bilaterally disposed at a bottom side thereof, said mounting plates having a respective coupling hole;

two linkages respectively coupled between the coupling holes on said mounting plates of said elongated pad and two opposite lateral sides of said notebook computer for permitting said elongated pad to be moved between a first position for covering a display unit hinged to a mainframe of a notebook computer and closed thereon, and a second position for supporting a front side of a mainframe of a notebook computer in a sloping position to support the wrists of a user and permitting said display unit to be opened from a mainframe of a notebook computer;

wherein said linkages are each four-bar linkages, each of said four-bar linkages comprising two first links having a respective top end respectively pivoted to the coupling hole on one mounting plate of said pad by a slip joint and a respective bottom end, and two second links having a respective top end respectively pivoted to the bottom ends of said first links and a respective bottom end respectively coupled together and pivoted to one side of said mainframe of said notebook computer; and lock means adapted to lock said elongated pad in said first position.

* * * * *